Figure 1:
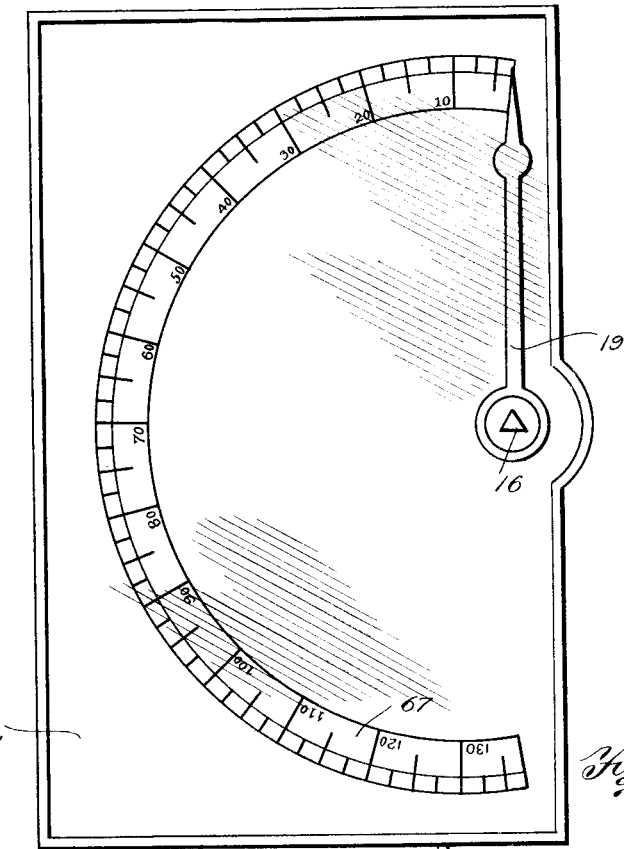

A. E. DE COST.
MEASURING SCALE.
APPLICATION FILED JULY 12, 1912.

1,129,557.

Patented Feb. 23, 1915.
4 SHEETS—SHEET 1.

Witnesses
M. P. McKee
L. E. Bobys

Inventor
Albert E. De Cost

By Alex. J. Wedderburn, Jr.
Attorney

THE NORRIS PETERS CO., PHOTO-LITHO., WASHINGTON, D. C.

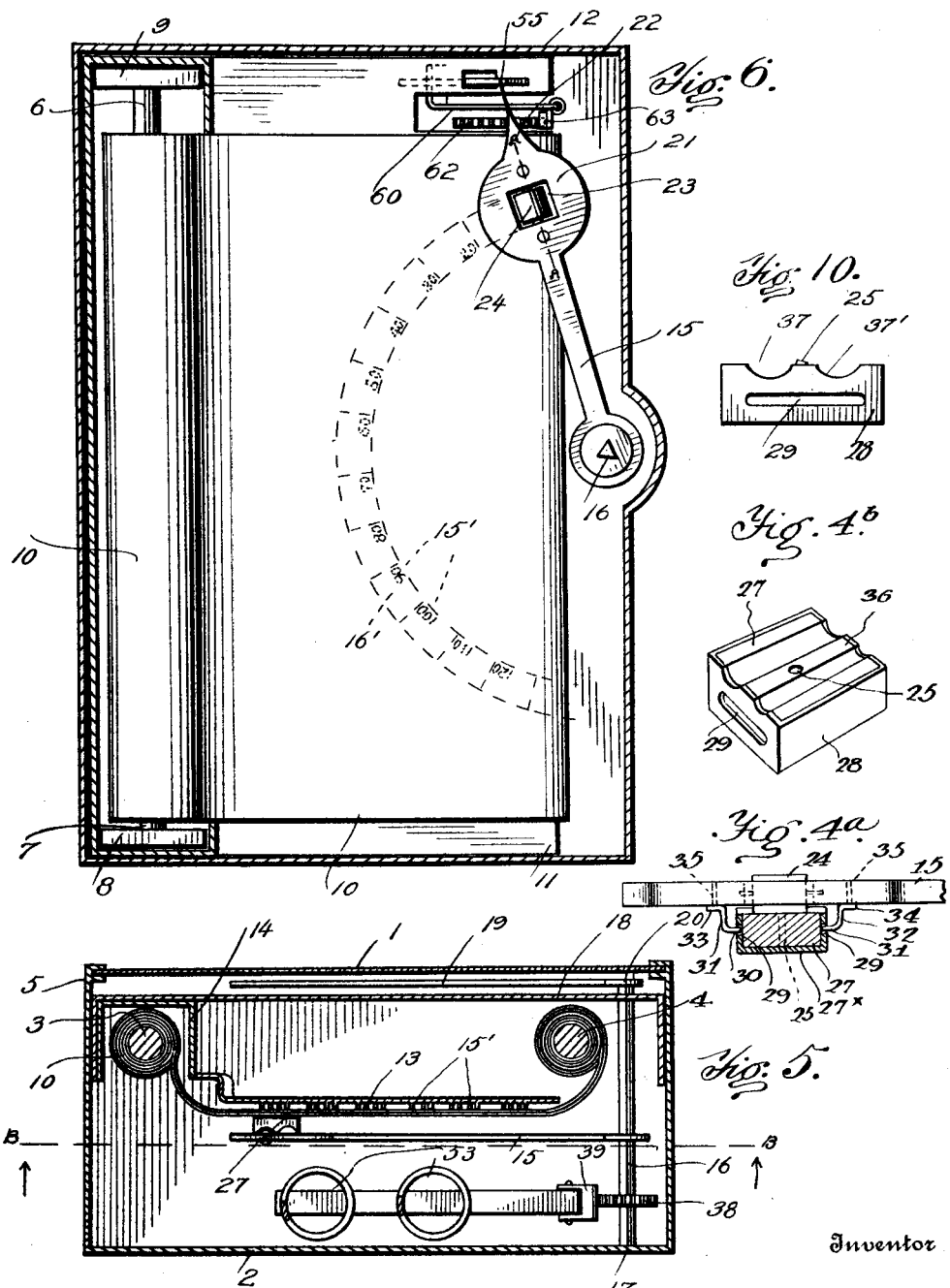

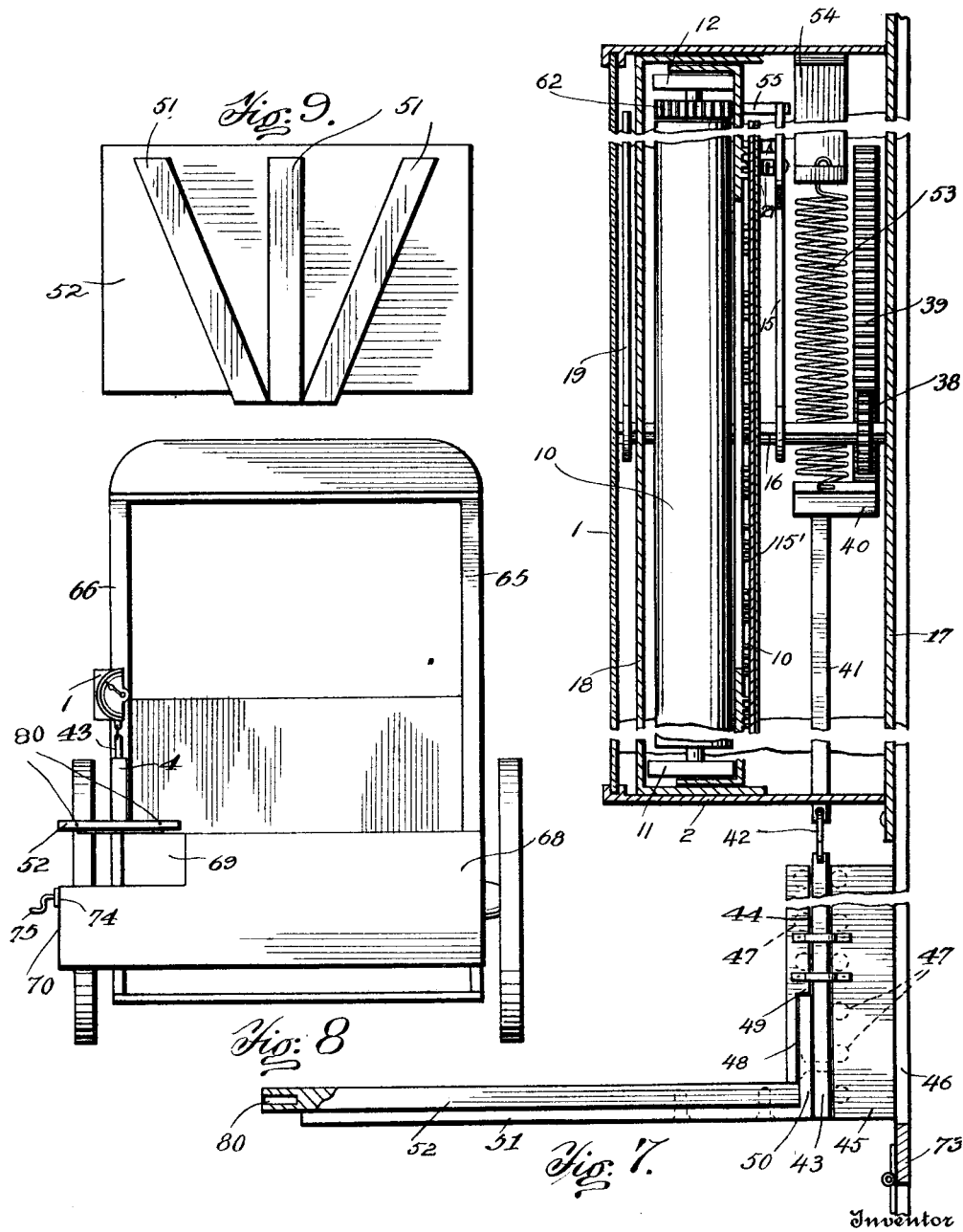

A. E. DE COST.
MEASURING SCALE.
APPLICATION FILED JULY 12, 1912.
1,129,557. Patented Feb. 23, 1915.
4 SHEETS—SHEET 4.
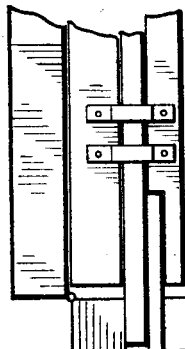
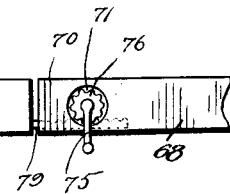
Fig. 11.
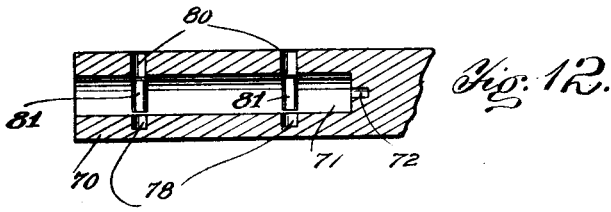
Fig. 12.
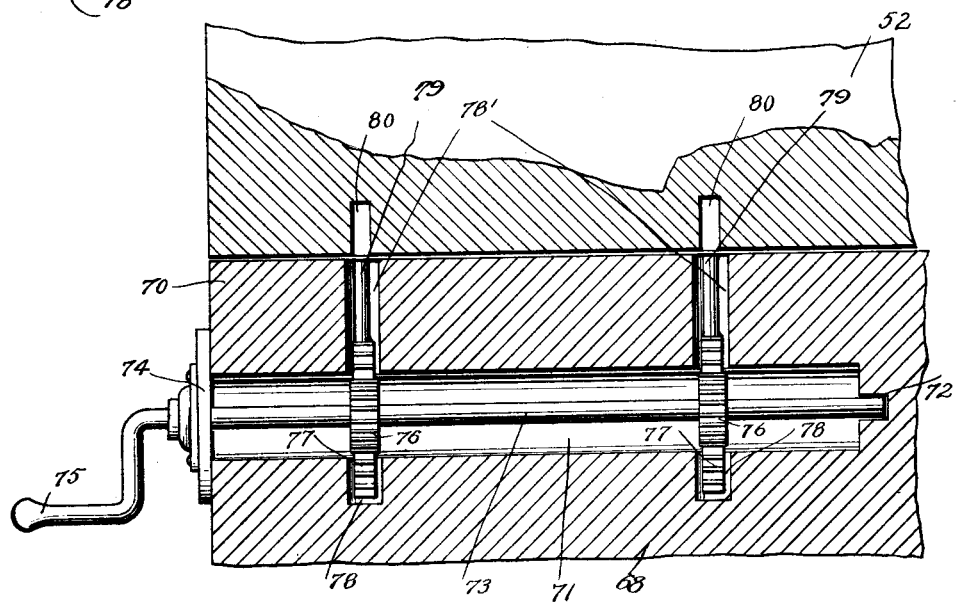
Fig. 13.
Inventor
Albert E. De Cost
Witnesses
M. P. McKee
L. C. Bobys
By Alex. J. Wedderburn, Jr.
Attorney

UNITED STATES PATENT OFFICE.

ALBERT E. DE COST, OF BOSTON, MASSACHUSETTS.

MEASURING-SCALE.

1,129,557.      Specification of Letters Patent.     Patented Feb. 23, 1915.

Application filed July 12, 1912. Serial No. 709,106.

*To all whom it may concern:*

Be it known that I, ALBERT E. DE COST, a citizen of the United States, residing at Somerville Station, Boston, in the county of Suffolk and State of Massachusetts, have invented certain new and useful Improvements in Measuring-Scales, of which the following is a specification.

This invention relates to improvements in measuring scales.

More specifically this invention is designed to not only indicate the weight of the article mounted upon the scale but to record said weight, and the arrangement is therefore such that a permanent record and a temporary visual indication are afforded by means of the scale. This is of importance in weighing and measuring ice and for the purpose of illustration there will be shown a form of my invention suitable for weighing ice and other relatively heavy objects.

With the above and other objects in view, my invention consists in the combination, arrangement and details of construction shown in the drawings and then more particularly pointed out in the appended claims.

Figure 3:
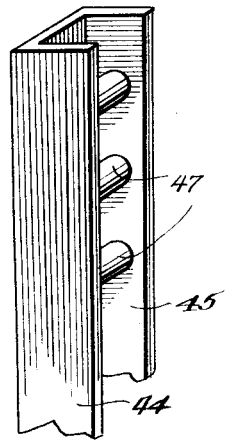
Figures 2, 4:
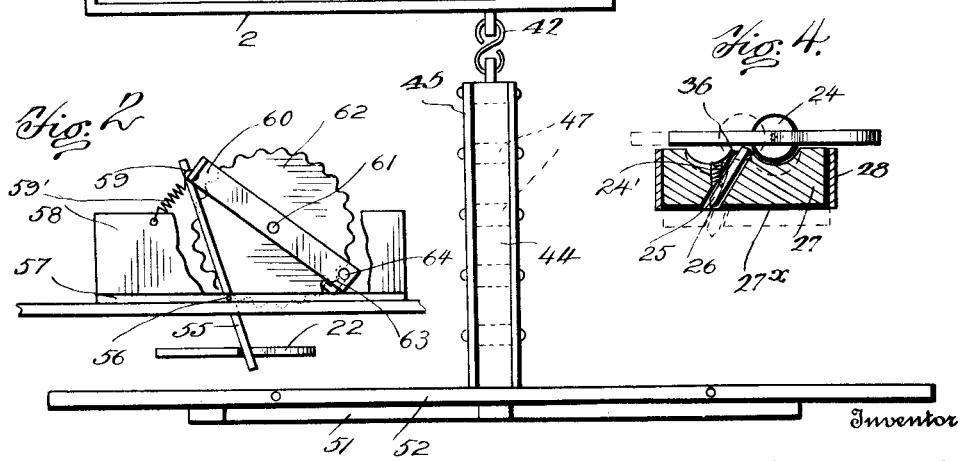

Similar reference characters indicate similar parts throughout the several views of the drawings in which, Figure 1 is a front elevation of a scale embodying my invention. Fig. 2 is a detail view partly broken away of a ratchet mechanism for intermittently feeding the paper upon which the mark is to be impressed. Fig. 3 is a fragmentary detail view of antifriction rolls against which the hanger or vertically movable member of the scale will have sliding contact. Figs. 4, 4ª and 4ᵇ are detail sectional views of the sheet perforating member to be hereinafter described. Fig. 5 is a transverse sectional view of the scale casing, Fig. 6 is a longitudinal sectional view taken on the line B—B of Fig. 5, the indicator being in a different position, Fig. 7 is a side elevation and partial section of a scale and platform attached thereto, Fig. 8 is a rear end elevation of an ice wagon showing my scale mounted thereupon, Fig. 9 is a detail view of the supporting means for the platform of the scale, Fig. 10 is an end view of a member arranged to force the paper in contact with the type which is to make the impression, Fig. 11 is a side elevation, showing the scale platform held flush with the tailboard by means carried by the latter. Fig. 12 is a fragmental view of the tailboard, showing in section the arrangement for accommodating the platform locking bolts to be described, and Fig. 13 is a sectional view of a portion of the tailboard showing the scale platform holding or locking mechanism in position therein.

Reference being made to the accompanying drawings, which are merely illustrative of the invention, 1 indicates a transparent member secured on the front of a casing 2, and said casing carries the longitudinally extending paper rolls 3 and 4 respectively, the roll 4 being mounted within the compartment 5 formed substantially at one corner of said casing, the pintles 6 and 7 of said last named roll, see Fig. 6, being mounted in bearing blocks 8 and 9 respectively, which are disposed opposite the end walls of the compartment 5, which compartment, as clearly shown in Fig. 6, extends from end to end of the casing 2. The roll of paper 10 is wound upon the shaft or roll 3 so that indications from a dial now to be described, may be permanently marked thereon. The free end of the paper roll is arranged to engage the longitudinally extending roll 4 whose pintles are mounted upon the oppositely arranged bearing blocks 11 and 12 respectively. The segmental member 13 which extends longitudinally and intermediate the ends of the casing 2 is supported by any suitable means upon the wall 14 forming one side of the compartment 5 between the rolls 3 and 4, and has formed upon its rear face a plurality of numerals 15' arranged in an arcuate line designated at 16', Fig. 6, which numerals serve as a dial with respect to the dial hand 15 which is arranged to have operative engagement with the paper, as clearly shown in Fig. 5, and said paper 10 is arranged to be advanced over and against the numerals 15' which are raised characters formed upon the member 13.

The hand 15 is suitably fixed upon a preferably polysided shaft 16 mounted at one end in the rear wall 17 of casing 2 and at its opposite end in the partition wall 18 extending longitudinally of said casing between which rear wall and the transparent member 1 is disposed to travel in a segmental path the pointer 19 fixed securely at 20 to the protruding end of the polysided shaft 16, said shaft projecting through the partition 18. Formed upon the free end of the hand 15 is a relatively large weighted portion 21 shown substantially circular and having a forwardly projecting pointer 22 arranged to have its outermost end projecting beyond the adjacent end of the roll 4 for a purpose to be described.

An opening 23 is formed preferably centrally of the weighted portion 21 of the hand 15 and mounted at opposite surfaces upon the portion 21 are pintles securing the roll 24, which is of such a diameter that the surface of the roll will project through the opening 23 so as to have engagement at times with the pin 25 acting as a plunger. This pin works in a hole 26 formed substantially centrally of a block 27, Fig. 4, said block being preferably made out of some soft material or having a soft facing 27˟ and making good frictional contact with the paper surface and being suitably incased in a metallic member 28. The spring 24' is disposed in block 27 in order to retract the pin 25. A transversely extending and preferably central slot 29 will be formed at the top and bottom respectively of the casing 28 inclosing said block 27, into each of which slots will project loosely the right angular offset 30 formed upon the outwardly extending portions 31 and 32 forming part of the relatively narrow members 33 and 34 having suitable offsets 35 secured within the part 21 of the hand 15. By means of this construction the hand 15 may be caused to so move relatively to the block 27 that the offsets 30 will slide in the slots 29 formed at the opposite ends of the casing 28. It will be noticed that the side of the block 27 adjacent the end 15 is formed with a central ridge or protuberance 36 so as to be engaged by the roll 24 as the latter is moved thereover and said pin will be thereby forced through the opening in which it is mounted to project through the block 27. Mounted upon the polysided shaft 16 adjacent the wall 17 of the casing 2 is a pinion 38 said shaft 16 being disposed intermediate the top and bottom of the casing 2, as clearly shown in Fig. 7, said pinion being arranged to mesh with the vertically disposed rack 39 having its bottommost portion normally spaced adjacent said pinion and secured upon the block 40 mounted upon the scale hanger 41 which hanger projects below the casing 2 and is suitably linked as at 42 to an extension 43 mounted between the channel iron member 44 and a similar relatively wider channel iron member 45 mounted upon the upright bar 46 upon which the casing 2 is secured. Disposed between the side walls of the members 44 and 45 are rollers 47 which are so mounted that the extension 43 may slidingly engage the rollers 47, which, as clearly shown in Fig. 7, are arranged at opposite sides of the member 43.

It will be seen in Fig. 7 that the member 44 is formed with a cut away portion 48 having a shoulder 49 normally engaged by an upturned member 50 integral with radiating arms 51 secured in any suitable manner to the bottom of and serving as a reinforcing means for the scale platform 52, the upright member 50 being secured by any suitable means to the lower end of the extension 43, the shoulder 49 formed in the member 44 being arranged to limit the upward movement of the platform 52 in an obvious manner.

Secured upon the block 40 in upright position is a retractile spring 53 secured at its upper end to a suitable bracket 54 depending from the top of the casing 2. The pointed end 22 formed upon the dial hand 15 is arranged as it is moved from its normal position to the appropriate numeral indicating the weight of the ice to rock or tilt the lever 55 pivoted at 56 to the portion 57 of the angle iron member 58, see Fig. 2 said lever projecting beyond the member 58 and being pivotally secured at 59 to a pawl carrying arm 60, pivoted at 61 on the shaft of a ratchet wheel 62, which ratchet wheel is mounted upon the paper roll 4, a coil spring 59' being pivotally secured to said member 58 and to the top of the lever 55. A pawl 63 is pivotally secured at 64 to the opposite end of the arm 60 and said pawl normally engages the serrated periphery of the ratchet wheel 62 so as to slightly rotate the roll 4 through the ratchet wheel 62.

In Fig. 8 the number 65 designates an ice wagon and it will be noticed that the scale is mounted upon the rear upright edge 66 of one of the side walls of the vehicle. Marked or otherwise inscribed upon the partition wall 18 is a segmental dial 67 having graduation marks thereon opposite which the pointer 19 will move to indicate to the consumer the weight of the ice purchased.

The mode of operation is as follows: When a given weight of ice or any other object is placed upon the platform 52 of the scale, the hanger 41 and extension 43 will be depressed and they will be guided between the oppositely arranged series of rollers 47 and this will depress the block 40 upon which the oppositely arranged coil springs are fixed and which carries the upright rack bar 39. As the rack bar 39 moves down it will actuate the wheel or pinion 38 and simultaneously rotate the shaft 16 upon which the pointer 19 and the hand 15 are fixedly mounted. The coil spring will be put under tension as the scale beam is depressed, and the pointer 19 will then move across the indicating segmental dial 67 and will come to rest to indicate the precise amount of ice weighed. The hand 15 will also move in unison with the pointer 16 to make an impression upon the surface of the paper 10 which overlies the member 13 so that a record of the amount of ice sold at any time can be made and preserved. The impression will be made by means of the roller 24 mounted in the hand 15, said roller moving in unison with said hand across the segmental plate 16' in order that an impression may be made at any point in the path in which the hand travels over the paper. When the hanger is being depressed the hand 15 will be moved and the block 27 carried by said hand will slide over the paper so as not to force the same against the raised numerals but when said hand comes to a stop against one of the numerals an impression will be made as soon as the ice or load is removed from the scale. When the load is removed the spring 53 will suddenly recoil with force and tend to retract the hand 15, and to move it relatively to the block 27. Owing to the sudden impact of the spring the pad or block 27 will frictionally engage the paper and force it against the carbon sheet mounted over the paper, and this is due to the circumstance that the pin 25 mounted in said block will be caused by the roller 24 to perforate the paper so that the block cannot immediately be moved although the hand 15 will be free to move to cause the roller 24 to ride up out of one depression of the block and into the other depression, thereby giving the roller 24 an opportunity for riding out of its recess 37 against the projecting end of the pin and over the protuberance to force the block against the paper and the paper against the numeral. It will thus be seen that the pin is arranged to perforate the paper in order to hold the block from moving over the paper until after the relative movement of the hand shall have moved the roller over the protuberance into the opposite recess of the block whereupon the pin will be disengaged from the paper after said paper has received an impression, and the hand 15 and the loosely connected block will then be free to move to said normal position.

When the hand 15 moves across the paper it will also operate the ratchet mechanism for advancing the given amount of the paper. The pointer portion 22 of the hand projects within range of the rock lever 55 and said lever will be tilted thereby causing said upper end to move the adjacent end of the pawl carrying arm 60 against the tension of the spring 59' as said arm is moved the pawl 63 will operate and rotate the ratchet wheel 62 a given distance. As the ratchet wheel 62 is thus rotated the paper roll 4 will be rotated and will take up a portion of the paper thereby rotating the roll 3 to unwind the amount of paper taken. In this way paper will be advanced before the hand comes to rest and cause the impression to be made on the paper, the retractile spring 59' recoiling when the pointed portion 22 rides clear of the rocking lever 55 to restore the pawl to normal position ready to repeat its operation. Owing to the transparent member 1 mounted upon the casing 2 the consumer is able to tell by means of the pointer 19 the precise weight of ice purchased.

I have provided means for holding the scale platform flush with the tail board of the ice-wagon to enable the ice to be slid along the tailboard and directly upon the scale-platform, thereby reducing the effort of the ice man. The means comprises sliding bolts actuatable by a handle. Reference being made to Figs. 11, 12, and 13, it will be seen that the tail-board is designated 68 and is formed with a cut-away portion 69 Fig. 8 bounded by the reduced part 70 of said tail-board, in which part the scale-platform holding means is mounted. Said part 70 is formed with a longitudinal bore 71 terminating at its inner end in a reduced socket 72 receiving the inner end of a shaft 73, Fig. 13, disposed in said bore and mounted at its outer end in a bearing 74 closing said bore, said shaft having a crank-handle 75 by which it may be turned to rotate in either direction. Pinions 76 are spaced apart and fixed on said shaft within the bore and mesh with rack bars 77 normally projecting into the recesses or sockets 78 formed in said tailboard, which sockets are in alinement with the transverse slots 78' into which normally project the bolts 79, and in which said rack-bars are also slidable when moving to locking position.

The rack bars 77 may be guided in transverse grooves 81 shown in Fig. 12. The scale platform 52 is formed with sockets 80 registering with the transverse slots 78' when the tail board is swung up into horizontal position, Fig. 11, the sockets being adapted to snugly receive the bolts 79 when said handle is turned to cause the pinions 76 to advance said rack bars 77; the rack bars when retracted by means of handle 75 will cause said bolts to be withdrawn from the sockets 80 so as to release the platform for weighing purposes, and also to enable the tail board to be moved to closed position when desired. When the tail board is maintained in horizontal position, handle 75 will be turned to move rack bar 78 so as to drive the locking bolts into sockets 80 formed in the scale platform 52, said platform fitting the cutaway portion 69 formed in the tail board 68. In this way the scale will not be able to descend while ice is being slid thereon, until, by a reverse movement of handle 75, the bolts will be retracted.

Numerous modifications may be resorted to in practice without departing from the details of construction disclosed.

I claim and desire to secure by Letters Patent:

1. A device of the character described comprising a casing, a platform beneath the casing, an upright member carried by the platform and projecting into said casing, a transversely extending shaft mounted intermediate the ends of said casing, a pointer at one end of said shaft, a wall at the forward end of said casing and formed with a central dial, over which said pointer moves, a paper roll mounted in said casing, a member in said casing formed with a flat surface having a plurality of raised numerals disposed in an arcuate line, a hand fixed to said shaft intermediate the ends thereof and arranged to move over said numerals, means for rotating said shaft as said upright member is depressed, means for advancing the paper over said raised numerals as said shaft is actuated, and means carried by the hand arranged to force the paper in contact with one of said numerals as said hand is moved thereover.

2. A device of the character described comprising a casing, a vertical member projecting into said casing, a platform secured at right angles at the bottom of said member, a back plate upon said casing, means upon said back plate for guiding said vertical member exteriorly of said casing, a transversely extending shaft mounted intermediate the ends of said casing and near one side, a pointer at one end of said shaft, a wall at the forward end of said casing and formed with a central dial over which said pointer moves, a paper roll mounted in said casing, a member in said casing formed with a flat surface having a plurality of raised numerals disposed in an arcuate line, a hand fixed to said shaft and arranged to move adjacent said numerals, means for rotating said shaft as said upright member is depressed, means for advancing the paper over said raised numerals as said shaft is actuated, and means carried by said hand arranged to force the paper in contact with one of said numerals as said hand is moved adjacent thereto.

3. A combined registering and indicating scale comprising a back plate, a casing mounted on said plate, a platform below said casing, means on the back plate for vertically guiding said platform, means mounted in said casing for supporting said platform and arranged to be depressed upon receiving a load, a transversely extending shaft mounted in said casing and rotated as said scale is depressed, rollers mounted in the walls of said casing at opposite ends thereof, a roll of paper, upon one of said rollers and extending between said rollers and adapted to be unwound from the first mentioned roller onto the second roller, a transparent member secured at the forward end of said casing, a wall disposed between said transparent member and said rollers, said shaft projecting through said last named wall, a pointer mounted upon the protruding end of said shaft, a segmental dial carried upon said last named wall adjacent which said pointer moves, a member supported in said casing on the rear of said rollers and having a plurality of numerals formed thereupon arranged in an arcuate line, a hand fixed upon said shaft, and projecting beyond one of said rollers, the paper passing from another of said rollers over said numerals, means carried by said hand arranged to force the paper against one of said numerals when said hand is depressed, and means actuated by the free end of said hand and connected with the adjacent roller to unwind the paper before said hand is moved across the numeral.

4. A device of the character described comprising a back plate, a casing mounted upon said back plate, a shaft extending transversely centrally of said casing, a central partition in said casing, a plurality of raised numerals formed in an arcuate line upon said partition, a transparent member mounted at the forward end of said casing, a pointer fixed upon said shaft and mounted adjacent the transparent member, a segmental dial plate adjacent said pointer, means for mounting said dial plate adjacent said pointer, a roll of paper in said casing arranged to be passed progressively over the raised numerals, a scale platform below the casing, means mounted on the back plate for guiding the movement of said platform, said platform being arranged to be depressed upon receiving a load, means to rotate said shaft on the depression of the platform, means mounted on said shaft arranged to advance the paper over said numerals when said shaft is actuated, and means controlling said last named means actuated by the removal of the load from the platform for forcing the paper in contact with one of said numerals.

5. A device of the character described comprising a back plate, a casing mounted upon said back plate, a shaft extending transversely centrally of said casing, a central partition in said casing, a plurality of raised numerals formed in an arcuate line upon said partition, a transparent member mounted at the forward end of said casing, a pointer fixed upon said shaft and mounted adjacent the transparent member, a segmental dial plate adjacent said pointer, means for mounting said dial plate adjacent said pointer, a roll of paper in said casing arranged to be passed progressively over the raised numerals, a scale platform below the casing, means mounted on the back plate for guiding said platform, a hand on said shaft movable in a path adjacent said numerals, means on the upper end of said hand arranged to force said paper against the appropriate numeral, and means controlled by said hand for advancing said paper over said numeral.

6. A device of the character described comprising a back plate, a casing mounted upon said back plate, a shaft extending transversely centrally of said casing, a central partition in said casing, a plurality of raised numerals formed in an arcuate line upon said partition, a transparent member mounted at the forward end of said casing, a pointer fixed upon said shaft and mounted adjacent the transparent member, a segmental dial plate adjacent said pointer, means for mounting said dial plate adjacent said pointer, a roll of paper in said casing arranged to be passed progressively over the raised numerals, a scale platform below the casing, means mounted on the back plate for guiding said platform, said platform being arranged to be depressed upon receiving a load, means to rotate said shaft on the depression of the platform, an arm fixed on said shaft adjacent said numerals and formed near its free end with a weighted enlargement terminating in a pointed portion, a relatively small roller disposed in said enlargement and projecting toward said numerals, a block formed with a central protuberance and a recess at each end thereof, in alinement with said roller, said roller being normally disposed in one of said recesses, means mounted on said arm allowing said pointed portion to move relatively to said block, said block being free to move across the paper as said arm is moved, said roller being arranged to engage the protuberance on said block to force the block to contact firmly with the paper, and thereby cause said paper to press against the appropriate numeral, means controlled by the pointed portion of said arm for advancing the paper over the numeral, and means for automatically retracting said arm and pointer simultaneously.

7. A device of the character described comprising a back plate, a casing mounted on the back plate, a shaft extending transversely in said casing, a transparent member mounted at the forward end of said casing, a wall adjacent said transparent member having a segmental dial formed thereupon, a pointer on said shaft disposed between said transparent member and said wall, a paper feed roll in said casing, a paper receiving roll in parallelism therewith adjacent said shaft, a compartment in which said paper feed roll is rotatably mounted, a plate mounted above said rolls over which the paper is moved, a plurality of indicating numerals formed centrally upon said plate, for engagement with said paper, a ratchet wheel at the end of said last named roll, an arm on said shaft adjacent said paper and having a pointed portion adjacent said ratchet wheel, means engaged by said pointed portion for actuating said ratchet wheel to cause said roll to wind the paper thereon, an impression member projecting from said arm over the paper, means for automatically actuating said impression member to force the paper into contact with the appropriate numeral, a platform below said casing, means in said casing protruding therethrough to support said platform, said platform being arranged to be depressed upon receiving a load, means to rotate said shaft on the depression of the platform, and means for automatically rotating said shaft in the opposite direction on removal of the load.

8. A device of the character described comprising a back plate, a casing mounted upon said back plate, a shaft extending transversely centrally of said casing, a central partition in said casing, a plurality of raised numerals formed in an arcuate line upon said partition, a transparent member mounted at the forward end of said casing, a pointer fixed upon said shaft and adjacent the transparent member, a segmental dial plate adjacent said pointer, means for mounting said dial plate adjacent said pointer, a roll of paper in said casing arranged to be passed progressively over the raised numerals, a scale platform below the casing, means mounted on the back plate for guiding the platform, said platform being arranged to be depressed upon receiving a load, means to rotate said shaft on the depression of the platform, an arm fixed upon said shaft adjacent said numerals and formed with a weighted enlargement terminating in a pointed portion, a relatively small roller disposed in said enlargement and projecting toward said numerals, a block formed with a central protuberance and a recess at each end thereof in alinement with said roller, a pin normally held within the block and projecting through the protuberance, said roller being arranged to automatically engage the projecting end of said pin, to cause it to penetrate the paper when said arm comes to rest, said arm forcing said block against the paper to press the latter against the numerals before it is retracted, means controlled by the pointed portion of said arm for advancing the paper over the numerals, and means for automatically retracting said arm and pointer.

9. In a scale in combination with a tailboard, means for holding the same in horizontal position, means for holding the scale-platform flush with said tailboard, and means for accommodating said tail-board to vertical movement adjacent said scale.

10. In a scale in combination with a tailboard, means for holding the same in horizontal position, means carried by said tailboard and engaging the scale platform to hold the latter flush thereagainst at one corner.

In testimony whereof I affix my signature in presence of two witnesses.

ALBERT E. DE COST.

Witnesses:
ALBERT G. DE COST,
FRED L. HALL.

Copies of this patent may be obtained for five cents each, by addressing the "Commissioner of Patents, Washington, D. C."